United States Patent [19]

Ho et al.

US005093003A

[11] Patent Number: 5,093,003

[45] Date of Patent: Mar. 3, 1992

[54] HALOGENATED POLYURETHANES

[75] Inventors: W. S. Winston Ho; Guido Sartori, both of Annandale; Warren A. Thaler, Flemington; Bruce H. Ballinger; David C. Dalrymple, both of Bloomsbury; Robert P. Mastondrea, Hackettstown, all of N.J.

[73] Assignee: Exxon Research and Engineering Company, Florham Park, N.J.

[21] Appl. No.: 676,777

[22] Filed: Mar. 25, 1991

Related U.S. Application Data

[62] Division of Ser. No. 422,182, Oct. 16, 1989, Pat. No. 5,028,685.

[51] Int. Cl.$^5$ .............................................. B01D 61/36
[52] U.S. Cl. ................................ 210/640; 210/500.28
[58] Field of Search .......................... 210/640, 500.28

[56] References Cited

U.S. PATENT DOCUMENTS 4,960,519  10/1990  Semuens .............................. 210/640
4,960,520  10/1990  Semuens .............................. 210/640

Primary Examiner—Morton Foelak
Attorney, Agent, or Firm—Ronald D. Hantman

[57] ABSTRACT

A new copolymer composition comprising the soft segment of an aliphatic polyester and the hard segment of a highly halogenated polyurethane containing from 3 to 36 halogen atoms is disclosed. The new halogenated polyurethane copolymer membrane has high thermal stability, and good selectivity and permeability for separation of an aromatic/saturate mixture.

8 Claims, 4 Drawing Sheets

SOFT SEGMENT GOVERNS SORPTION—SELECTIVITY/PERMEABILITY

ADVANCED POLYURETHANE WITH HIGHLY CHLORINATED HARD SEGMENT SYNTHESIZED FOR HIGH-TEMPERATURE SEPARATION

- Hard Segment without Cl

- Hard Segment with 2 Cl

- Hard Segment with 6 Cl (Advanced Polyurethane)

HALOGENATED POLYURETHANES

This is a division of application Ser. No. 422,182, filed Oct. 16, 1989, now U.S. Pat. No. 5,028,685.

BACKGROUND

The present invention relates to a composition of matter for the separation of aromatics from saturates.

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e., aromatic, unsaturated, saturated, by permeating a portion of the mixture through a non-porous cellulose ether membrane and removing permeate from the permeate side of the membrane using a sweep gas or liquid. Feeds include hydrocarbon mixtures, e.g., naphtha (including virgin naphtha, naphtha from thermal or catalytic cracking, etc.).

U.S. Pat. No. 2,930,754 teaches a method for separating hydrocarbons, e.g., aromatic and/or olefins from gasoline boiling range mixtures, by the selective permeation of the aromatic through certain non-porous cellulose ester membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

Compared to distillation, membrane permeation can lead to considerable energy savings. A membrane can separate a mixture of aromatics and saturates, e.g., a heavy cat naphtha, into a high-octane, mainly aromatic permeate and a high-cetane, mainly saturated retentate. Both permeate and retentate are more valuable than the starting heavy cat naphtha.

SUMMARY OF THE INVENTION

The present invention is a composition of matter and its use in a process for separating aromatics from feeds which are mixtures of aromatics and non-aromatics. The composition is formed into a membrane which includes a copolymer composition: the soft segment is an aliphatic polyester and the hard segment is a highly halogenated polyurethane, wherein the soft and hard segments are alternating, the aliphatic polyester soft segment is a polyadipate, a polysuccinate, a polymalonate, a polyoxalate or a polyglutarate, and each halogenated polyurethane hard segment contains from 3 to 36 halogen atoms. The polyurethane hard segment is derived from a diisocyanate having between 4 and 30 carbon atoms and a diamine having between 2 and 30 carbon atoms.

In a preferred embodiment, the polyester soft segment is polyethylene adipate or polyethylene succinate and the polyurea/urethane hard segmen is derived from a chlorinated diisocyanate and a chlorinated diamine. The chlorinated diisocyanate is methylene dichlorophenylisocyanate (dichloro MDI), methylene bis(dichlorophenylisocyanate) (tetrachloro MDI), methylene dichlorocyclohexylisocyanate (dichloro $H_{12}$-MDI), or methylene bis(dichlorocyclohexylisocyanate) (tetrachloro $H_{12}$-MDI). The diamine is methylene di-o-chloroaniline (MOCA), methylene bis(dichloroaniline) (tetrachloro MDA), methylene dichlorocyclohexylamine ($H_{12}$-MOCA), or methylene bis(dichlorocyclohexylamine) (tetrachloro $H_{12}$-MDA).

DESCRIPTION OF THE PREFERRED EMBODIMENT

The present invention is new copolymers for membranes to separate aromatics from feedstreams of aromatics and non-aromatics. The copolymer contains alternating soft and hard segments.

Figure 1:
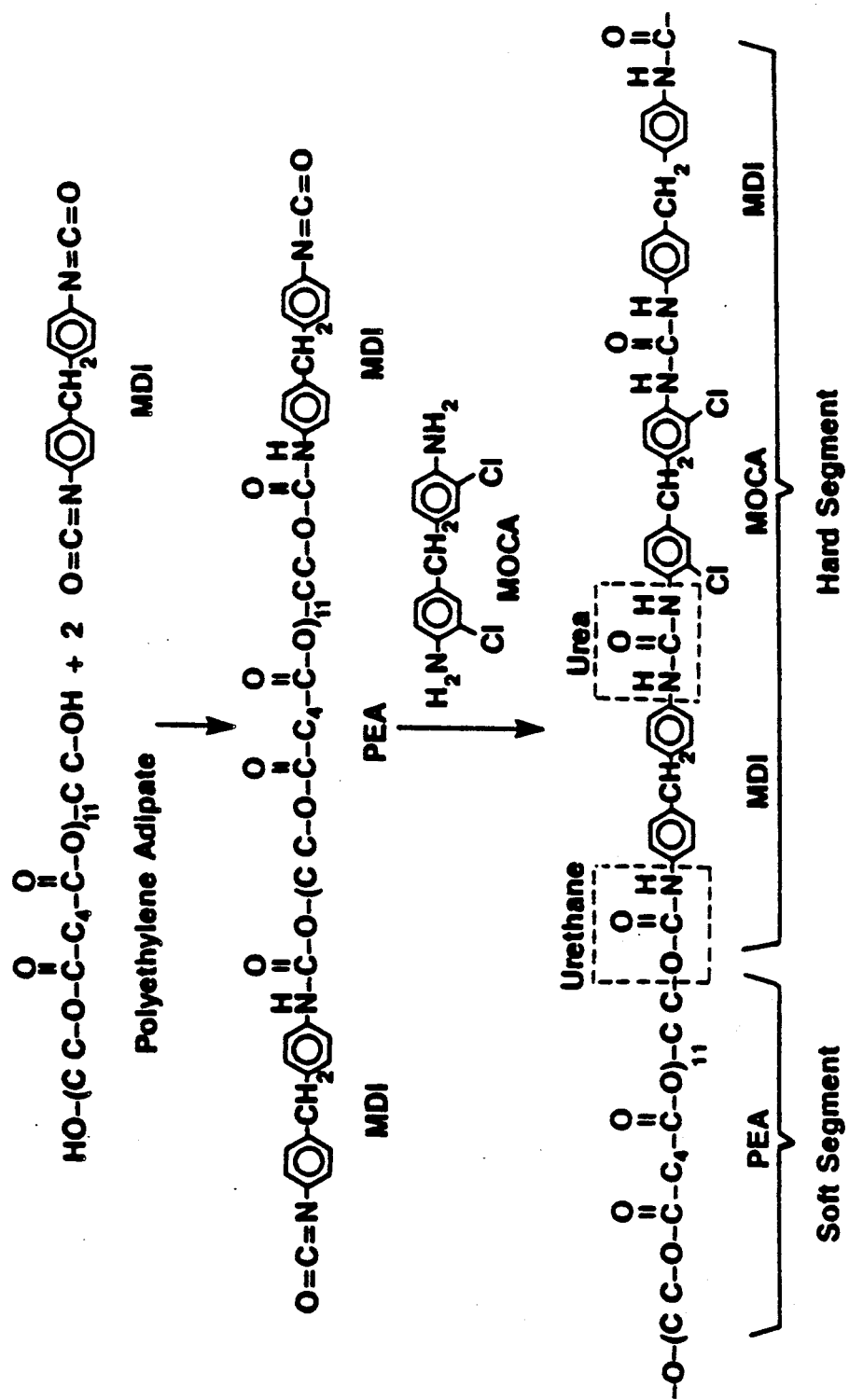
FIG. 1 shows the synthesis and composition of the copolymer containing the soft segment of polyethylene adipate and the hard segment of the polyurea/urethane with 2 chlorines.

We have synthesized a copolymer containing the soft segment of polyethylene adipate with a molecular weight of 2000 and the hard segment of the polyurea/urethane with 2 chlorines. The soft and hard segments are alternating in the copolymer. FIG. 1 shows the synthesis and composition of the copolymer. In the synthesis, one mole of polyethylene adipate diol reacts with 2 moles of methylene diphenylisocyanate (MDI). That is, polyethylene adipate abbreviated as PEA is end-capped with MDI to make a pre-polymer. This pre-polymer is then chain-extended with di-o-chloroaniline (MOCA) to make the copolymer containing the soft segment of PEA and the hard segment of polyurea/urethane hard segment with 2 chlorines (MDI-MOCA-MDI).

Figure 2:
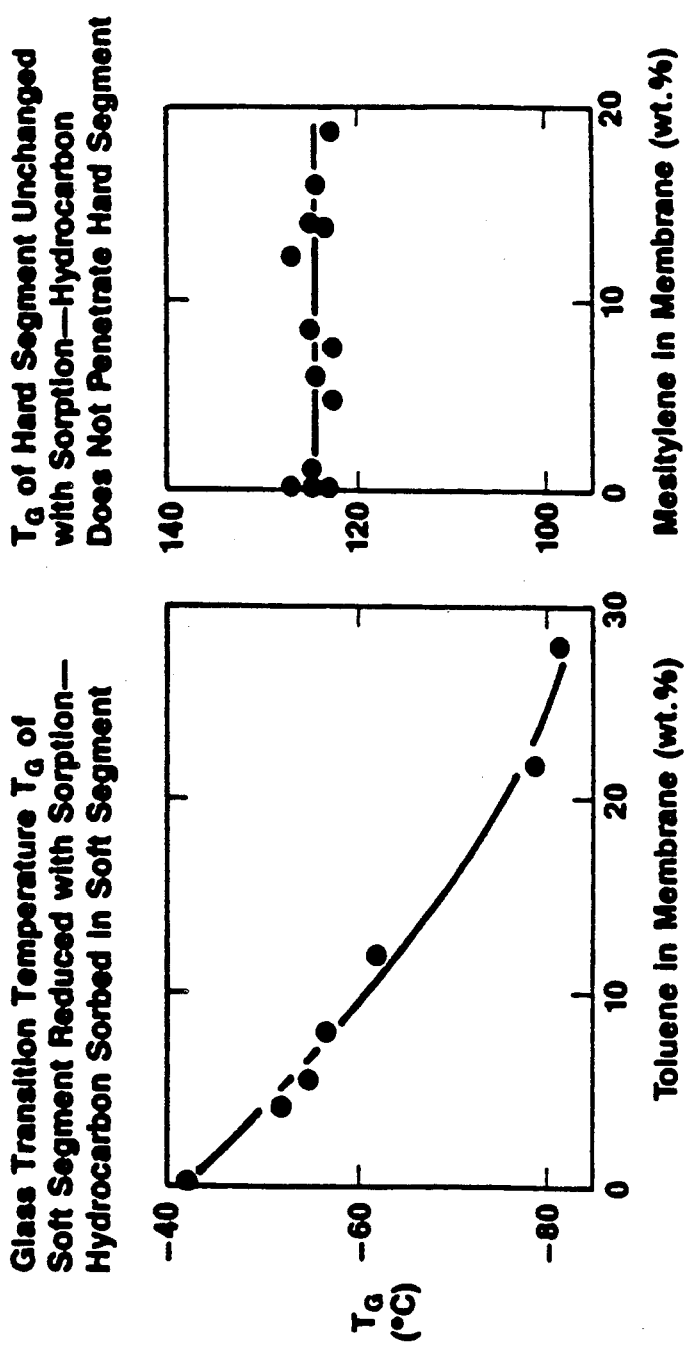
FIG. 2 shows that the soft segment governs sorption of hydrocarbons, i.e., selectivity and permeability.

We have elucidated the function of soft and hard segments for membrane separation. The soft segment governs sorption of hydrocarbons, i.e., selectivity and permeability whereas the hard segment provides the thermal stability of the membrane. We have studied the glass transition temperatures, Tg, of the soft and hard segments of the copolymer shown in FIG. 1. The diagram on the left hand side of FIG. 2 shows Tg results for the soft segment. The Tg of the soft segment is reduced with the sorption of toluene in the polyurethane membrane. This means that the hydrocarbon is sorbed in the soft segment. The diagram on the right hand side shows Tg results for the hard segment. The Tg of the hard segment is unchanged with the sorption of mesitylene in the membrane. This means that the hydrocarbon does not penetrate the hard segment. Mesitylene instead of toluene was used in the Tg experiments since the Tg of the hard segment is higher than the boiling point of toluene. As shown in these diagrams, the hard segment has a much higher Tg than the soft segment. These Tg results show that the soft segment governs sorption. That is, the soft segment governs selectivity and permeability.

Table 1 shows that the hard segment provides the thermal stability of the membrane. This table gives two evidences to support this conclusion. The first evidence is that a chlorinated hard segment gives a better membrane stability than a hard segment without chlorine. We express the thermal stability as the temperature above which there is a drastic decrease in selectivity and a sudden increase in permeability. The chlorinated hard segment from MDI and MOCA gives a membrane stability of 150° C. However, the hard segment without chlorine, which is from MDI and methylene dianiline, results in a membrane stability of only 100° C. Both membranes have the same soft segment of polyethylene adipate with a molecular weight of 2000. The chlorinated hard segment has a higher glass transition temperature than the hard segment without chlorine. The enhanced membrane stability and higher glass transition temperature for the chlorinated hard segment are presumably due to the dipole-dipole interaction of the chlorine groups. The second evidence is that crosslinking of the hard segment improves the thermal stability of the membrane. As shown in the lower part of this table, the hard segment is from toluene diisocyanate (TDI) and phenylene diamine. Crosslinking of the hard segment is via the use of 1,1,1-trimethylol-ethane to replace 25 mole % of phenylene diamine in the hard segment. The crosslinked hard segment gives a better membrane stability than the hard segment without crosslinking. Both membranes have the same soft segment of polydiethyleneglycol adipate with a molecular weight of 2000.

TABLE 1

HARD SEGMENT PROVIDES THERMAL STABILITY

|  | Membrane Stability (°C.) | Glass Transition Temperature (°C.) |
| --- | --- | --- |
| Chlorinated Hard Segment Gives Better Stability | | |
| Chlorinated Hard Segment (MDI/MOCA) | 150 | 125 |
| Hard Segment Without Chlorine (MDI/Methylene Dianiline) | 100 | 95 |
| Crosslinking of Hard Segment Improves Stability | | |
| Crosslinked Hard Segment (TDI/Phenylene Diamine) | 120 | 125 |
| Hard Segment Without Crosslinking | 80 | — |

Through our finding of the thermal-stability improvement with chlorinated hard segment, we have synthesized the new copolymers of the present invention. The new copolymers contain aliphatic polyester soft segments and highly halogenated polyurea/urethane hard segments. The new copolymers have exhibited the highest thermal stability among the polyurethanes investigated for pervaporation separation of an aromatic/saturate mixture.

The new copolymer containing the soft segment of polyethylene adipate (PEA) and the hard segment of the highly chlorinated polyurea/urethane with 6 chlorines has been synthesized from polyethylene adipate diol, methylene dichlorophenylisocyanate (dichloro MDI), and MOCA. In the synthesis, one mole of polyethylene adipate diol reacts with 2 moles of dichloro MDI. That is, polyethylene adipate diol is end-capped with dichloro MDI to make a pre-polymer. This pre-polymer is then chain-extended with MOCA to make the new copolymer containing the highly chlorinated polyurea/urethane hard segment with 6 chlorines.

In the synthesis, dimethyl formamide (DMF) is used as solvent in the chain-extension step. This gives a concentrated solution of the new copolymer in DMF. The copolymer membrane can be prepared by casting the solution on a glass plate or a porous support, adjusting the thickness by means of a casting knife, and drying the membrane first at room temperature to remove most of the solvent, then at 120° C. overnight. The membrane is then removed from the glass plate via soaking in water. Finally, this membrane is then dried again at 120° C. overnight.

The new copolymer membranes can be used for the separation of aromatics from saturates. In our separation experiments, the membranes are employed to separate a mixture containing toluene and isooctane in a pervaporation apparatus. The initial mixture contains about equal weights of the two hydrocarbons. The pervaporation apparatus is a cell separated into two compartments by a porous metal plate, on which the membrane is supported. During a pervaporation experiment the toluene-isooctane mixture is circulated through the upper compartment at the desired temperature. The lower compartment is kept at reduced pressure. The permeate is collected in a trap cooled with dry ice-acetone or isopropanol and periodically analyzed by gas chromatography.

The membranes are useful for the separation of aromatics from saturates in petroleum and chemical streams, and have been found to be particularly useful for the separation of large substituted aromatics from saturates as are encountered in heavy cat naphtha streams. Other streams which are also suitable feed streams for aromatics from saturates separation are intermediate cat naphtha streams boiling at 93°–160° C., light aromatics content streams boiling in the $C_5$–150° C. range, light catalytic cycle oil boiling in the 200°–345° C. range as well as streams in chemical plants which contain recoverable quantities of benzene, toluene, xylenes (BTX) or other aromatics in combination with saturates. The separation techniques which may successfully employ the membranes of the present invention include perstraction and pervaporation.

Perstraction involves the selective dissolution of particular components contained in a mixture into the membrane, the diffusion of those components through the membrane and the removal of the diffused components from the downstream side of the membrane by the use of a liquid sweep stream. In the perstractive separation of aromatics from saturates in petroleum or chemical streams (particularly heavy cat naphtha streams) the aromatic molecules present in the feed-stream dissolve into the membrane film due to similarities between the membrane solubility parameter and those of the aromatic species in the feed. The aromatics then permeate (diffuse) through the membrane and are swept away by a sweep liquid which is low in aromatic content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $C_3$ to $C_6$ saturated hydrocarbons and lube basestocks ($C_{15}$–$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

If $C_3$ or $C_4$ sweep liquids are used at 25° C. or above in liquid state, the pressure must be increased to keep them in the liquid phase.

Pervaporation, by comparison, is run at generally higher temperatures than perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and emerge on the permeate side under the influence of a concentration gradient. Pervaporative separation of aromatics from saturates can be performed at a temperature of about 25° C. for the separation of benzene from hexane but for separation of heavier aromatic/saturate mixtures, such as heavy cat naphtha, higher temperatures of at least 80° C. and higher, preferably at least 100° C. and higher, more preferably 120° C. and higher should be used. Temperatures of about 170° C. have been successfully used with membranes of the present invention, the maximum upper limit being that temperature at which the membrane is physically damaged. Vacuum on the order of 1–50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundle configurations with either the feed or the sweep liquid (or vacuum) in the internal space of the tube or fiber, the other material obviously being on the other side.

When the membrane is used in a hollow fiber configuration with the feed introduced on the exterior side of the fiber, the sweep liquid flows on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

The new copolymer composition of the present invention comprises the soft segment of an aliphatic polyester and the hard segment of a highly halogenated polyurethane. The aliphatic polyester soft segment is a polyadipate, a polysuccinate, a polymalonate, a polyoxalate or a polyglutarate. Each halogenated polyurethane hard segment contains from 3 to 36 halogen atoms. The polyurethane hard segment is derived from a diisocyanate having between 4 and 30 carbon atoms and a diamine having between 2 and 30 carbon atoms.

The diisocyanate is selected from the group consisting of toluene diisocyanate, methylene diphenyisocyanate (MDI), methylene dichlorophenylisocyanate (dichloro MDI), methylene bis(dichlorophenylisocyanate) (tetrachloro MDI), methylene dicyclohexylisocyanate ($H_{12}$-MDI), methylene dichlorocyclohexylisocyanate (dichloro $H_{12}$-MDI), and methylene bis(dichlorocyclohexylisocyanate) (tetrachloro $H_{12}$-MDI).

The diamine is selected from the group consisting of phenylene diamine, methylene dianiline (MDA), methylene di-o-chloroaniline (MOCA), methylene bis(dichloroaniline) (tetrachloro MDA), methylene dicyclohexylamine ($H_{12}$-MDA), methylene dichlorocyclohexylamine ($H_{12}$-MOCA), methylene bis(dichlorocyclohexylamine) (tetrachloro $H_{12}$-MDA), 4,4,-(hexafluoroisopropylidene)-bis-aniline (6F diamine) 3,3'-diaminophenyl sulfone (3,3'DAPSON), 4,4,-diaminophenyl sulfone (4,4'DAPSON), 4,4'-dimethyl-3,3'-diaminophenyl sulfone (4,4'-dimethyl-3,3,DAPSON), 2,4-diamino cumene, methylene bis(di-o-toluidine), oxydianiline (ODA), bisaniline A, bisaniline P, thiodianiline, 2,2-bis[4-(4-aminophenoxy) phenyl] propane (BAPP), bis[4-(4-aminophenoxy) phenyl] sulfone (BAPS), 4,4'-bis(4-aminophenoxy) biphenyl (BAPB), 1,4-bis(4-aminophenoxy) benzene (TPE-Q), and 1,3-bis(4-aminophenoxy) benzene (TPE-R).

In a preferred embodiment, the polyester soft segment is polyethylene adipate or polyethylene succinate and the polyurea/urethane hard segment is derived from a chlorinated diisocyanate and a chlorinated diamine. The chlorinated diisocyanate is methylene dichlorophenylisocyanate (dichloro MDI), methylene bis(dichlorophenylisocyanate) (tetrachloro MDI), methylene dichlorocyclohexylisocyanate (dichloro $H_{12}$-MDI), or methylene bis(dichlorocyclohexylisocyanate) (tetrachloro $H_{12}$-MDI). The diamine is methylene di-o-chloroaniline (MOCA), methylene bis(dichloroaniline) (tetrachloro MDA), methylene dichlorocyclohexylamine ($H_{12}$-MOCA), or methylene bis(dichlorocyclohexylamine) (tetrachloro $H_{12}$-MDA).

The new membranes from the new copolymer composition of the present invention can separate toluene from isooctane, showing good selectivity and permeability. The membrane has exhibited the highest thermal stability, about 170° C., among the polyurethanes investigated for pervaporation separation of the toluene/isooctane mixture.

The present invention will be better understood by reference to the following examples which are offered by way of illustration and not limitation.

EXAMPLE 1

Synthesis of the New Chlorinated Polyurethane (With 6-Cl Hard Segment)

Dichloro MDI in a quantity of 3.19 g (0.01 mole) was heated under N2 in a reactor until it was melted at about 104°–105° C. To the dichloro MDI was added gradually 10 g (0.005 mole) of polyethylene adipate diol with a molecular weight of about 2000 with stirring. This was done so that the diol would always have an excess of dichloro MDI to react with until the completion of the end-capping step. To the reactor content was added about 15 g of DMF with stirring. The temperature was then reduced to about 70° C. Then a solution of 1.34 g MOCA (0.005 mole) in 5 g DMF was added to the reactor for a period of about 1 hour to carry out the chain-extension step at 70° C. to make the chlorinated polyurethane. The reactor content was then cooled to room temperature overnight, and this resulted in a thick solution of the chlorinated polyurethane product in DMF. Finally, addition of 5 g DMF gave the resulting solution with suitable consistency for solution casting in the preparation of membranes.

EXAMPLE 2

Preparation of the New Chlorinated Polyurethane Membrane (With 6 Cl Hard Segment)

The resulting solution described in Example 1 was centrifuged for about 5 minutes. Following centrifugation, a membrane was knife-cast onto a glass plate with a knife gap setting of 14 mils. DMF was allowed to evaporate from the membrane in a hood at ambient conditions over a period of about 17 hours. The membrane was then dried in an oven at 120° C. overnight. The membrane was then removed from the glass plate by soaking it in a water bath. Finally, the membrane was dried at 120° C. overnight. The resulting membrane had a thickness of about 65 microns.

EXAMPLE 3

Pervaporation Results

The resulting membrane described in Example 2 was evaluated for aromatic/saturate separation with the feed mixture of 50 wt% toluene and 50 wt% isooctane in the pervaporation apparatus described above. Other two different polyurethane membranes were also evaluated in the same apparatus and same way for comparison.

Figure 3:
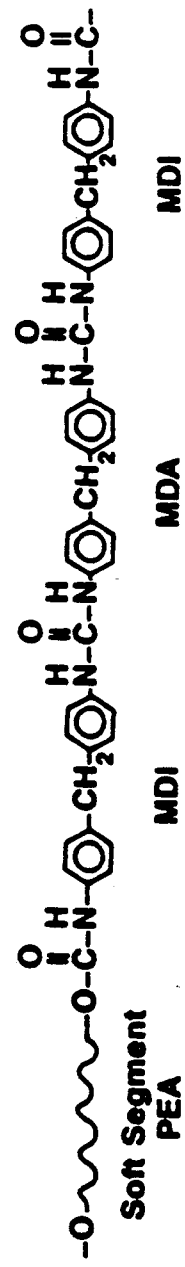
FIG. 3 shows examples of three polyurethanes.
Figure 3:
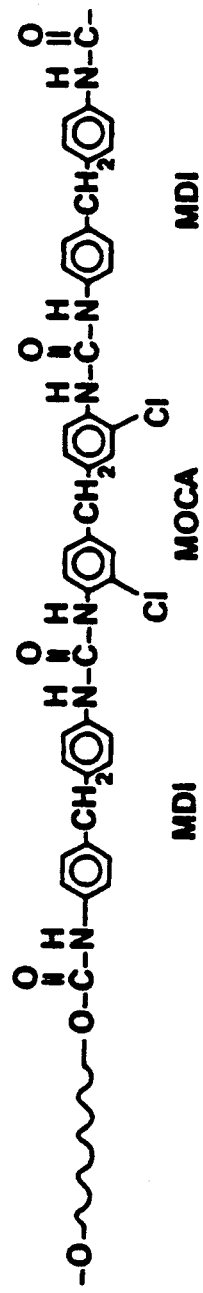
Figure 3:
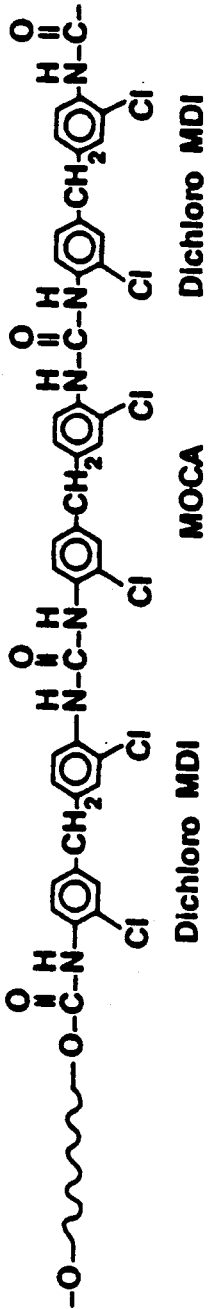

FIG. 3 shows the three polyurethanes with the same soft segment but with three different hard segments. The soft segment was the polyethylene adipate (PEA) with a molecular weight of 2000. The first polyurethane had a hard segment without chlorine, which was MDI/methylene dianiline (MDA)/MDI. The second polyurethane had a hard segment with 2 chlorines, which was MDI/MOCA/MDI. The third polyurethane had a hard segment with 6 chlorines which was dichloro MDI/MOCA/dichloro MDI. This is the advanced polyurethane of Example 1, the membrane of Example 2, and a new membrane of the present invention.

Figure 4:
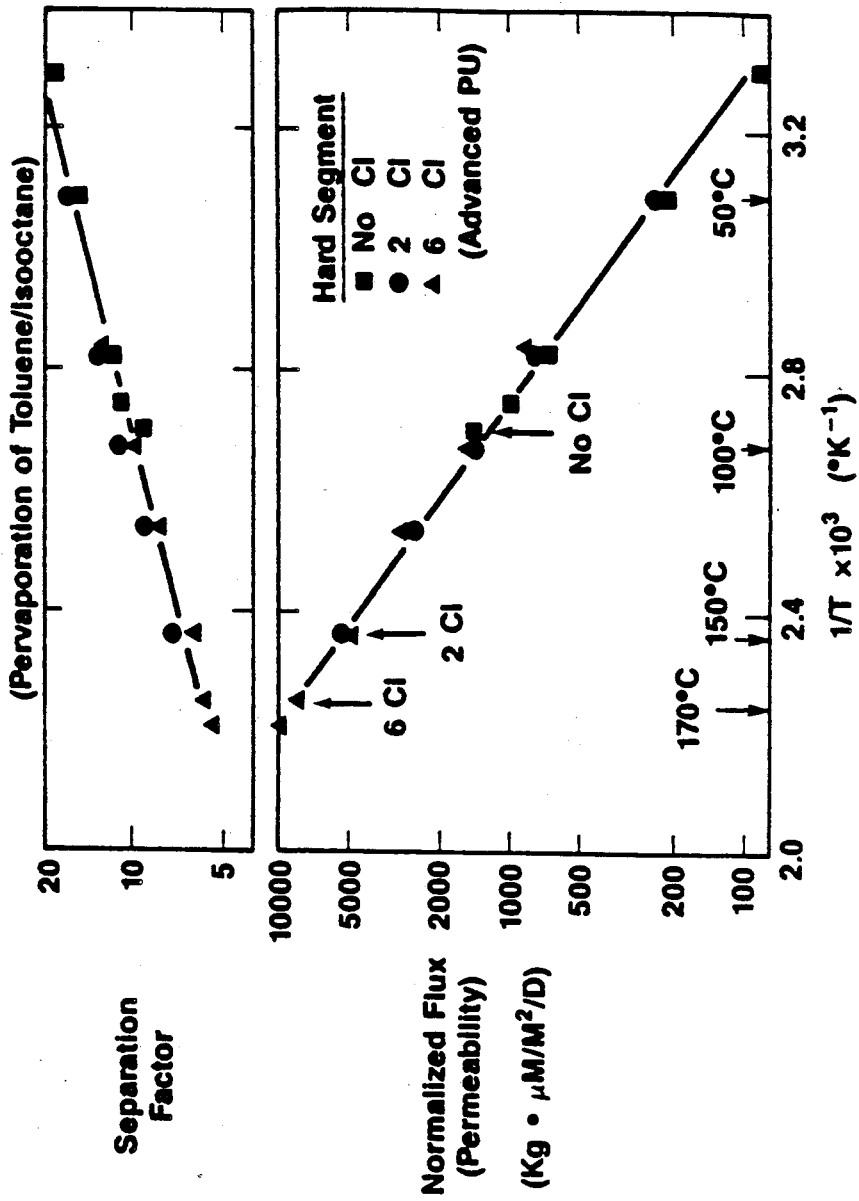
FIG. 4 shows a comparison of three polyurethanes in pervaporation of toluene/isooctane feed.

FIG. 4 compares the performance for these three polyurethane membranes with different hard segments in the pervaporation of the toluene/isooctane feed. In the lower part of this figure, we plot normalized flux, i.e., permeability in the unit of kilogram of permeate per meter square membrane area per day for a normalized membrane thickness of 1 micron, as a function of temperature. The hard segment without chlorine gave a membrane stability of 100° C. The hard segment with 2 chlorines resulted in a membrane stability of 150° C. However, the advanced polyurethane containing the hard segment with 6 chlorines had a thermal stability of about 170° C. This figure shows that the permeability was identical for these three membranes at a given temperature, at which they were stable. This was due to the fact that they had the same soft segment. The upper part of this figure shows that the selectivity was about the same for these three membranes at a given temperature, at which they were stable. This was also due to the fact that they had the same soft segment. Therefore, change in hard segment did not affect selectivity and permeability significantly. This has reinforced our finding that the soft segment governs selectivity and permeability. These results show that the advanced polyurethane with the highly chlorinated hard segment has the highest thermal stability among the polyurethanes investigated.

EXAMPLE 4

Synthesis of the New Polyurethane with the Hard Segment Containing 10 Chlorines 10 g of polyethylene adipate diol, MW 2,000 (0.005 mole) was put into a glass reactor and brought to 70° C. with stirring 3.88 g of tetrachloro MDI (0.01 mole), suspended in 20 g of dimethylformamide, was added. The beaker containing the tetrachloro MDI slurry in DMF was rinsed with another 2 g of DMF, which was added to the reactor. The reaction mass was stirred at 70° C. for 4 hours and 30 minutes. Using a pipet, a 2.255 g sample, corresponding to 0.873 g of polymer, was taken. Another 0.163 g of sample remained in the pipet. Titration with n-butylamine, followed by back-titration with HCl, showed that the endcapping was nearly complete. 1.09 g of MOCA, dissolved in 2 g of DMF, was added. After stirring for an hour at 70° C., the reaction mass was allowed to cool overnight with stirring. On the following day the mass was thick enough and two membranes were cast on glass.

EXAMPLE 5

Synthesis of New Polyurethane with Hard Segment Containing 8 Chlorines 10 g of polyethylene adipate diol, MW 2,000 (0.005 mole) and 3.54 g of dichloro MDI (0.010 mole) were put into a glass reactor and stirred at 70° C. for 4 hours. After addition of 10 ml of dimethylformamide, the temperature was brought to 80° C. and stirring was continued for another 30 minutes. 1.57 g of methylene-bis-dichloroaniline (0.005 mole) dissolved in 10 ml of DMF, were added and stirring was continued at 80° C. for 2 hours. As the solution was too thin to cast, DMF was evaporated until the necessary thickness was achieved. Four membranes were cast on glass.

What is claimed is:

1. A method for separating aromatics from feeds which are mixtures of aromatics and non-aromatics which method comprises selectively permeating the aromatic hydrocarbon through a thin membrane including a polymer composition comprising the soft segment of an aliphatic polyester and the hard segment of a highly halogenated polyurethane wherein the soft and hard segments are alternating, the aliphatic polyester soft segment is a polyadipate, a polysuccinate, a polymalonate, a polyoxalate or a polyglutarate, and each halogenated polyurethane hard segment contains from 3 to 36 halogen atoms.

2. The method of claim 1 wherein said halogen is chlorine.

3. The method of claim 1 wherein said polyester is polyethylene adipate or polyethylene succinate.

4. The method of claim 1 wherein said polyurethane hard segment is derived from a diisocyanate having between 4 and 30 carbon atoms and a diamine having between 2 and 30 carbon atoms.

5. The method of claim 4 wherein said diisocyanate is selected from the group consisting of toluene diisocyanate, methylene diphenylisocyanate (MDI), methylene dichlorophenylisocyanate (dichloro MDI), methylene bis(dichlorophenylisocyanate) (tetrachloro MDI), methylene dicyclohexylisocyanate ($H_{12}$-MDI), methylene dichlorocyclohexylisocyanate (dichloro $H_{12}$-MDI), and methylene bis(dichlorocyclohexylisocyanate) (tetrachloro $H_{12}$-MDI).

6. The method of claim 4 wherein said diamine is selected from the group consisting of phenylene diamine, methylene dianiline (MDA), methylene di-o-chloroaniline (MOCA), methylene bis(dichloroaniline) (tetrachloro MDA), methylene dicyclohexylamine ($H_{12}$-MDA), methylene dichlorocyclohexylamine ($H_{12}$-MOCA), methylene bis(dichlorocyclohexylamine), tetrachloro $H_{12}$-MDA), 4,4'-(hexafluoroisopropylidene)-bis-aniline (6F diamine) 3,3'-diaminophenyl sulfone (3,3'DAPSON), 4,4'-diaminophenyl sulfone (4,4'DAPSON), 4,4'-dimethyl-3,3'-diaminophenyl sulfone (4,4'-dimethyl-3,3'DAPSON), 2,4-diamino cumene, methylene bis(di-o-toluidine), oxydianiline (ODA), bisaniline A, bisaniline P, thiodianiline, 2,2-bis[4-(4-aminophenoxy) phenyl] propane (BAPP), bis[4-(4-aminophenoxy) phenyl] sulfone (BAPS), 4,4'-bis(4-aminophenoxy) biphenyl (BAPB), 1,4-bis (4-aminophenoxy) benzene (TPE-Q), and 1,3-bis (4-aminophenoxy) benzene (TPE-R).

7. The method of claim 4 wherein said diisocyanate is methylene dichlorophenylisocyanate (dichloro MDI) or methylene bis(dichlorophenylisocyanate) (tetrachloro MDI).

8. The method of claim 4 wherein said diamine is methylene di-o-chloroaniline (MOCA) or methylene bis(dichloroaniline) (tetrachloro MDA).

* * * * *